(12) United States Patent
Tassitino, Jr. et al.

(10) Patent No.: US 7,405,494 B2
(45) Date of Patent: Jul. 29, 2008

(54) AC POWER SUPPLY APPARATUS, METHODS AND COMPUTER PROGRAM PRODUCTS USING PWM SYNCHRONIZATION

(75) Inventors: Frederick Tassitino, Jr., Wake Forest, NC (US); Hans-Erik Pfitzer, Wake Forest, NC (US); Jason S. Anderson, Raleigh, NC (US); Michael Westerfield, Durham, NC (US)

(73) Assignee: Eaton Corporation, Cleveland, OH (US)

( * ) Notice: Subject to any disclaimer, the term of this patent is extended or adjusted under 35 U.S.C. 154(b) by 483 days.

(21) Appl. No.: 10/886,483

(22) Filed: Jul. 7, 2004

(65) Prior Publication Data

US 2006/0006741 A1 Jan. 12, 2006

(51) Int. Cl.
*H02J 1/12* (2006.01)
(52) U.S. Cl. .......................................... 307/45; 327/163
(58) Field of Classification Search ................... 307/45, 307/64; 363/71; 327/160, 162, 163; 700/286
See application file for complete search history.

(56) References Cited

U.S. PATENT DOCUMENTS

| | | | | |
|---|---|---|---|---|
| 4,733,341 A | * | 3/1988 | Miyazawa | 363/71 |
| 5,745,356 A | | 4/1998 | Tassitino, Jr. et al. | |
| 6,118,680 A | * | 9/2000 | Wallace et al. | 363/71 |
| 6,381,157 B2 | * | 4/2002 | Jensen | 363/71 |
| 7,002,384 B1 | * | 2/2006 | Chong et al. | 327/158 |
| 2005/0286274 A1 | * | 12/2005 | Pfitzer et al. | 363/37 |
| 2006/0215064 A1 | * | 9/2006 | Dawson et al. | 348/730 |

OTHER PUBLICATIONS

Chen et al., "The Burn-in Test of Three-Phase UPS by Energy Feedback Method," IEEE, 1993, pp. 766-771.
Chu et al., "Self-load bank for UPS testing by circulating current method," IEE Proc.-Electr. Power Appl., vol. 141, No. 4, Jul. 1994, pp. 191-196.

* cited by examiner

*Primary Examiner*—Michael J Sherry
*Assistant Examiner*—Daniel Cavallari
(74) *Attorney, Agent, or Firm*—Myers Bigel Sibley & Sajovec (57) ABSTRACT

Paralleled uninterruptible power supplies (UPSs) including respective pulse-width modulation (PWM) power converter circuits coupled in common to an AC load bus have PWM cycles that are synchronized. In particular, sampling of control inputs of the PWM power converter circuits may be synchronized, such that, for example, sampling of control inputs to the PWM power converter circuits occurs at substantially the same time for each of the PWM power converter circuits. A common phase reference corresponding to an AC voltage phase for the AC load bus may be provided, and the PWM cycles of each of the power converter circuits may synchronized, e.g., phase locked, to the common phase reference. More particularly, the respective PWM cycles of the UPSs may be phase locked to phase locked sinusoidal reference signals generated at each of the UPSs. Sampling for other control functions may also be synchronized to the PWM cycles.

35 Claims, 10 Drawing Sheets

AC POWER SUPPLY APPARATUS, METHODS AND COMPUTER PROGRAM PRODUCTS USING PWM SYNCHRONIZATION

The invention relates to power supplies, and more particularly, to apparatus, methods and computer program products for operating AC power supplies in parallel.

Figure 1:
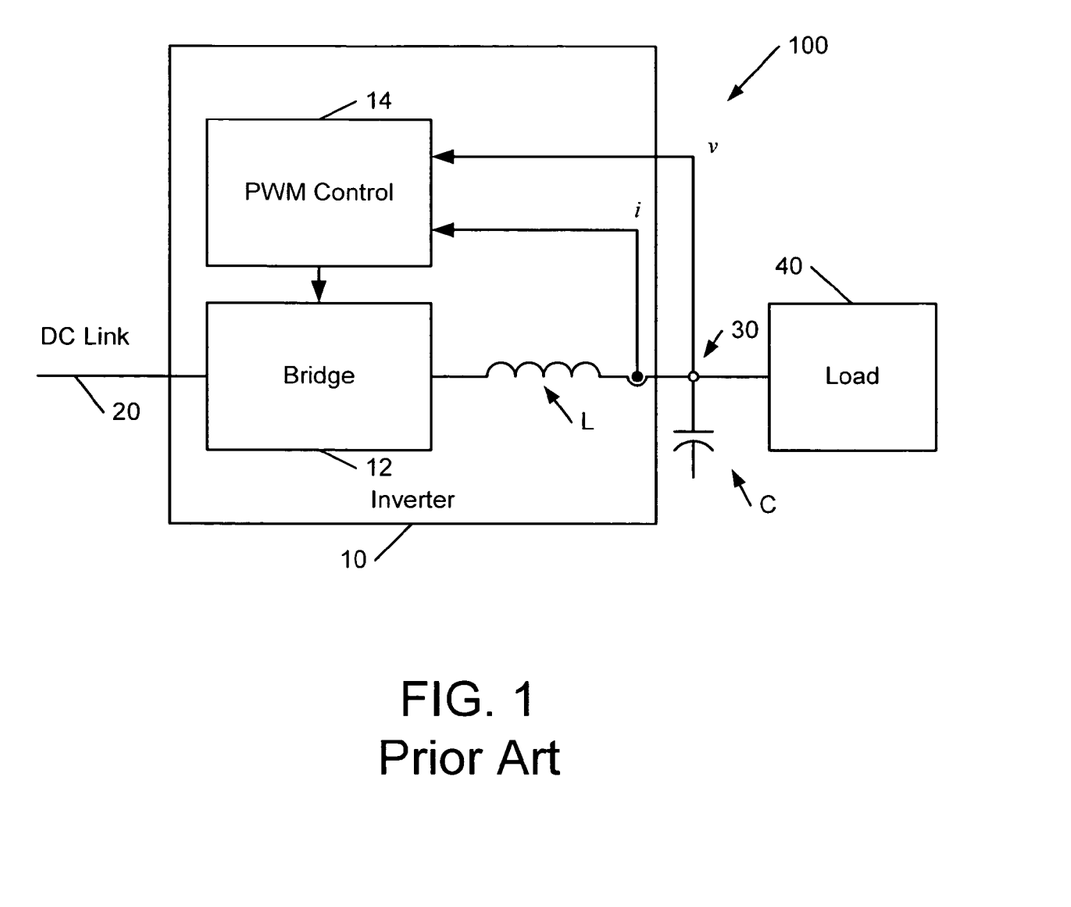
FIGS. 1-3 are schematic diagrams illustrating conventional UPS apparatus and operations.

As shown in FIG. 1, a typical conventional UPS 100 includes an output inverter 10 coupled to an output 30 of the UPS 100 by an inductor L. The inverter 10 further includes a bridge circuit 12 (e.g., a network of half-bridges including complementary insulated gate bipolar transistors (IGBTs)) that is controlled by a digital pulse width modulation (PWM) control circuit 14 responsive to control inputs, such as an output voltage v and an output current i at the output 30. The digital PWM control circuit 14 typically samples the control inputs v, i each PWM cycle, and performs control law computations and develops PWM control outputs to the bridge circuit 12 between the sample instants. The bridge circuit 12 selectively couples a DC link 20 of the UPS 100 to a load 40 at the output 30 via a filter including the inductor L and a capacitor C responsive to the PWM control outputs.

Figure 2:
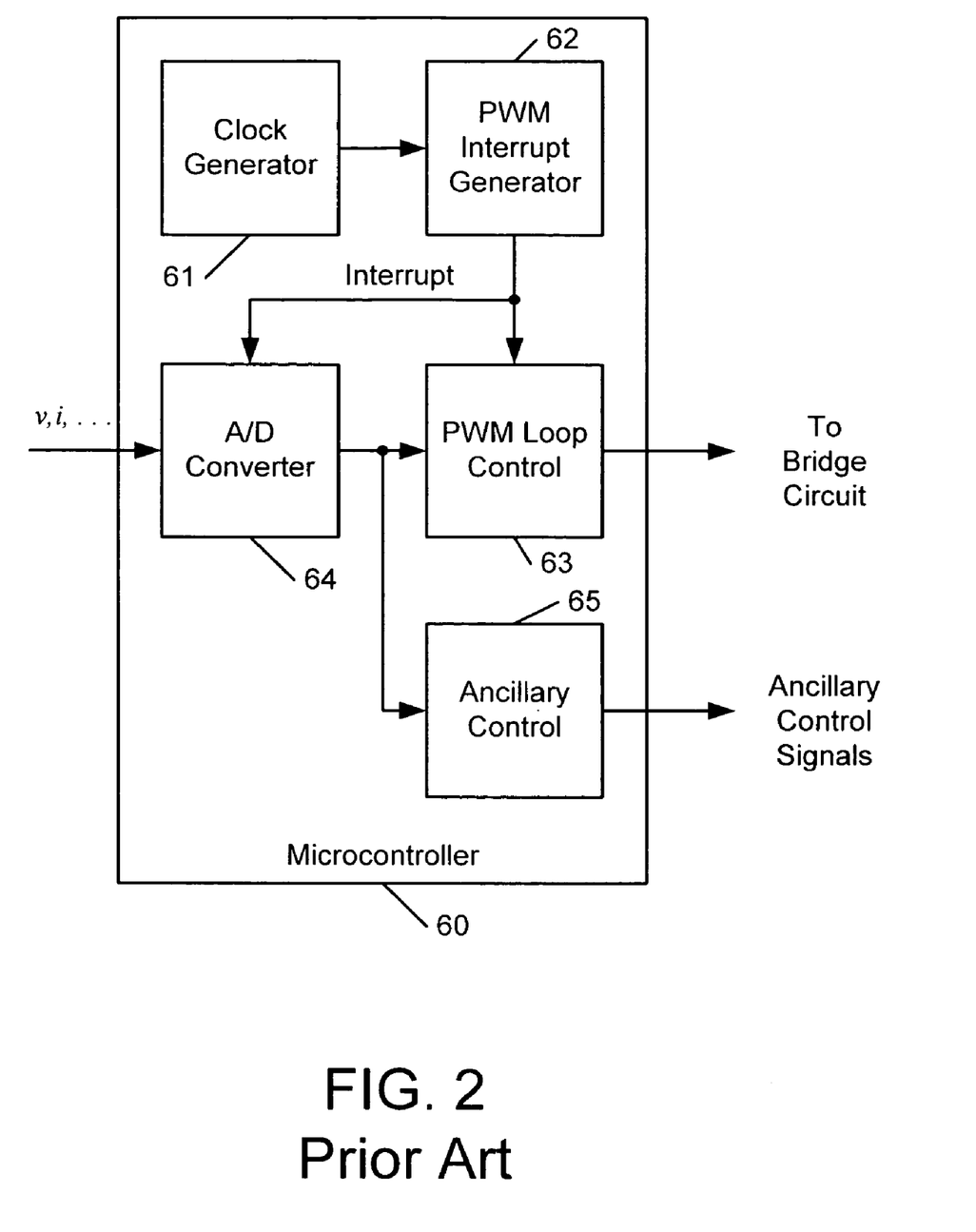

A typical digital control structure for a conventional UPS is shown in FIG. 2. In particular, functional blocks that perform various PWM and other control tasks for a UPS are implemented in a microcontroller 60 tailored for PWM control. A clock generator block 61 generates a system clock for the microcontroller 60. Responsive to the system clock, an interrupt generator block 62 generates interrupts that define PWM cycles for a PWM loop control block 63 that generates control outputs for a bridge circuit. The interrupts are also provided to an analog to digital (A/D) converter block 64 that samples feedback signals v, i, . . . for the PWM loop computations at instants defined by the interrupts. An ancillary control block 65, e.g., an outer control loop block, also receives sampled data at the same rate from the A/D converter block 64. The ancillary control functions that use these inputs may have varying bandwidths, and the control inputs to these functions may be oversampled and/or undersampled.

Referring again to FIG. 1, the PWM switching of the bridge circuit 12 generally generates harmonics in the sampled control inputs v, i. If not filtered, these harmonics can deleteriously affect operation of the PWM control circuit 14 and/or other control circuits that use the same control inputs. For example, harmonics can cause aliasing and beating that can affect control of the inverter 10 and other system controls. Such effects may be particular deleterious for control functions that receive data that is not oversampled, as it may not be feasible to filter out harmonics from such data.

Figure 3:
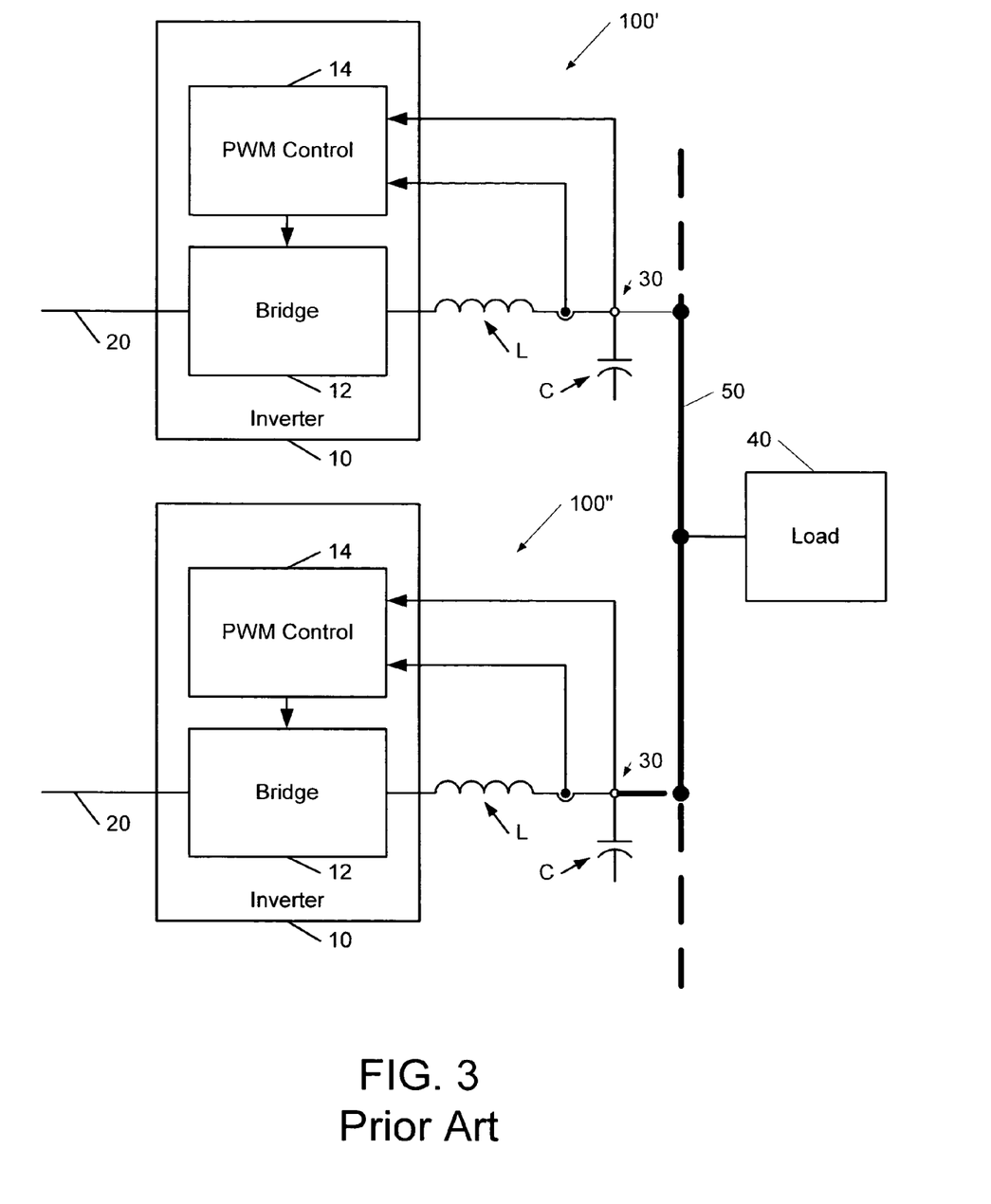

UPSs, such as that illustrated in FIG. 1, are sometimes connected in common (paralleled) at a load bus 50 to meet the power requirements of a load 40. In such a configuration, the effects of PWM harmonics can be even more deleterious. In particular, referring to FIG. 3, when UPSs 100', 100" are connected in parrallel, each output capacitor C may receive harmonic currents generated by the other UPS. This can stress the output capacitors C and lead to failure. In addition, interaction of harmonics may lead to heightened interference with control functions. Conventional solutions to such harmonics are to provide passive filtering, such as inductors interconnecting the paralleled UPSs. However, such an approach may be costly and/or lead to excessive volume and/or weight.

SUMMARY OF THE INVENTION

According to some embodiments of the invention, paralleled uninterruptible power supplies (UPSs) including respective pulse-width modulation (PWM) power converter circuits coupled in common to an AC load bus have PWM cycles that are synchronized. In particular, sampling of control inputs of the PWM power converter circuits may be synchronized, such that, for example, sampling of control inputs to the PWM power converter circuits occurs at substantially the same time for each of the PWM power converter circuits.

In some embodiments of the invention, a common phase reference corresponding to an AC voltage phase for the AC load bus may be provided, and the PWM cycles of each of the power converter circuits may synchronized, e.g., phase locked, to the common phase reference. More particularly, the respective PWM cycles of the UPSs may be phase locked to phase locked sinusoidal reference signals generated at each of the UPSs. According to further embodiments, respective power transfers at the common AC load bus may be determined for the respective UPSs, and the respective sinusoidal reference signals may be generated responsive to the respective determined power transfers.

In still further embodiments of the invention, a timing error of PWM cycles with respect to a sinusoidal reference signal is determined, and a PWM cycle duration is adjusted responsive to determined timing error. For example, a number of PWM cycles occurring between phase indicia (e.g., zero crossings) of a sinusoidal reference signal may be determined, and a PWM cycle duration may be adjusted responsive to the determined number of PWM cycles. More particularly, a number of complete PWM cycles occurring between a first phase indicator of the sinusoidal reference signal and a second phase indicator of the sinusoidal reference signal may be determined. A fraction of a PWM cycle occurring between a phase indicator of the PWM cycle (e.g., a starting or ending point) and the second phase indicator of the sinusoidal reference signal may also be determined. A PWM cycle duration may be adjusted based on the determined number of complete PWM cycles and the determmined fraction of a PWM cycle.

In further embodiments of the invention, a frequency error is estimated by comparing an actual angle step per PWM cycle to a desired angle step. A zero crossing location of the sinusoidal reference signal with respect to a PWM cycle is estimated, e.g., by interpolation, from discrete values of the sinusoidal reference signal corresponding to PWM cycle features. A phase error is estimated by comparing the estimated zero crossing location to a reference point of a PWM cycle. A PWM cycle duration is adjusted responsive to the frequency error and the phase error.

According to further aspects of the invention, at least one of the UPSs further includes an additional control circuit that samples an operating parameter of the at least one UPS. Sampling of the operating parameter may be synchronized to the synchronized PWM cycles of the at least one UPS. For example, input data for the PWM power converter circuit and the additional control circuit of the at least one UPS may be sampled responsive to a common interrupt, which may be phase locked to a common phase reference for the paralleled UPSs.

According to further embodiments of the invention, a system includes a plurality of paralleled UPSs, the UPSs including respective PWM power converter circuits coupled in common to an AC load bus and operating according to synchronized PWM cycles. The UPSs may have synchronized sampling of control inputs for their PWM converters, e.g., UPSs may be operative to phase lock their PWM cycles such that sampling of control inputs to their PWM power converter circuits occurs at substantially the same time. The UPSs may be operative to synchronize the PWM cycles of each of the power converter circuits to a phase reference corresponding to an AC voltage for the AC load bus. At least one of the UPSs may further include an additional control circuit that samples an operating parameter of the at least one UPS, and the at least one UPS may be operative to synchronize sampling of the operating parameter to the synchronized PWM cycles of the at least one UPS.

According to additional embodiments of the invention, a UPS includes a first PWM power converter circuit configured to be coupled to an AC load bus. The UPS further includes a PWM cycle synchronizer circuit operative to synchronize PWM cycles of the first PWM power converter circuit to PWM cycles of a second PWM power converter circuit coupled to the AC load bus.

In still further embodiments of the invention, a computer program product is provided for controlling a UPS having a first PWM power converter circuit configured to be coupled to an AC load bus. The computer program product comprises a computer readable storage medium having computer readable program code embodied therein, the computer readable program code comprising program code configured to synchronize PWM cycles of the PWM power converter circuit to PWM cycles of a second PWM power converter circuit coupled to the AC load bus.

DETAILED DESCRIPTION OF EXEMPLARY EMBODIMENTS

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied as apparatus, methods and computer program products. Embodiments of the invention may include hardware and/or software. Furthermore, the invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the invention may be written in an object oriented programming language such as Java®, Smalltalk or C++. However, the computer program code for carrying out operations of the invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Embodiments of the invention include circuitry configured to provide functions described herein. It will be appreciated that such circuitry may include analog circuits, digital circuits, and combinations of analog and digital circuits.

The invention is described below with reference to block diagrams and/or operational illustrations of methods, apparatus and computer program products according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some alternate implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

Some embodiments of the invention arise from a discovery that the deleterious effects of harmonics generated by PWM power converters of paralleled UPSs (or other AC power supplies) may be reduced by synchronizing the PWM cycles of the PWM power converters, and more particularly, by phase locking the PWM cycles of the PWM power converters. According to some embodiments of the invention, PWM cycles of paralleled digitally-controlled PWM power converters may be phase-locked such that the control inputs, e.g., voltage and current, to the PWM converters are sampled substantially synchronously, i.e., at substantially the same time. In some embodiments of the invention, phase locking may be achieved by phase locking the PWM cycles of the PWM converters to mutually-phase-locked sinusoidal reference signals for each of the UPSs. Such sinusoidal reference signals may be generated using phase/frequency information derived from power measurements. Additional harmonic suppression may be provided by also synchronizing sampling of control inputs to ancillary control functions of the UPSs to the synchronized PWM cycles.

Figure 4:
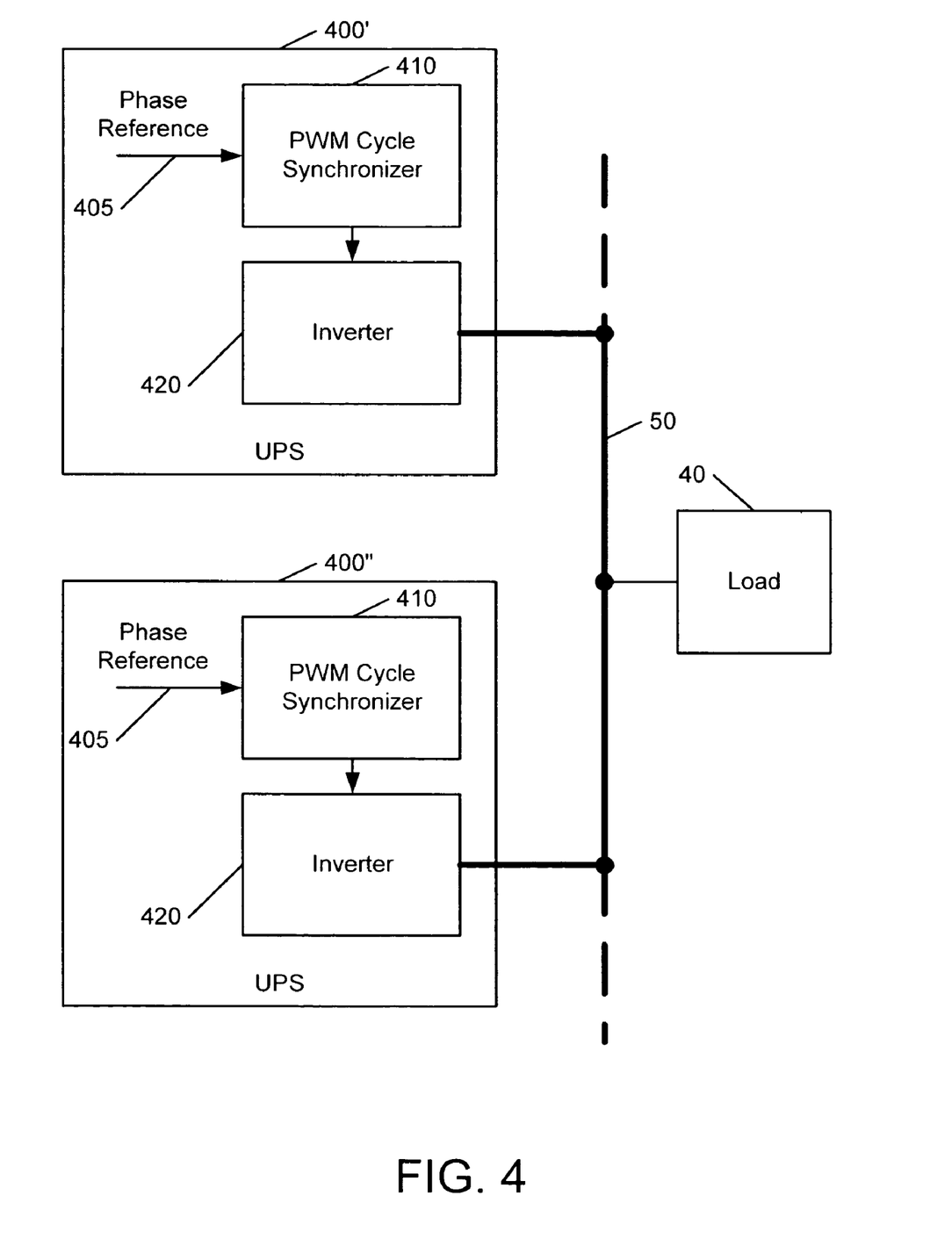
FIG. 4 is a schematic diagram illustrating an UPS apparatus and operations according to some embodiments of the invention.

FIG. 4 illustrates a paralleled arrangement of UPSs 400', 400" according to some embodiments of the invention. Each of the UPSs 400', 400" includes an inverter 420 that has an output coupled to an AC load bus 50. The UPSs 400', 400" further include PWM cycle synchronizer circuits 410 that synchronize PWM cycles of the inverters 420 to a common phase reference 405. As discussed in detail below, the common phase reference 405 may include, for example, respective phase-locked digital sinusoidal reference signals that are provided at each of the UPS's 400', 400", and the PWM cycle synchronizer circuits 410 may comprise digitally-implemented phase-locked loops that phase locks PWM cycles of the inverters 420 to the sinusoidal reference signals. It will be appreciated that PWM cycle synchronization may be implemented in a number of different ways within the scope of the invention, including in analog, digital and mixed analog/digital implementations.

FIGS. 5-10 illustrate exemplary control structures and operations for providing PWM cycle synchronization according to some embodiments of the invention. The structures illustrated in FIGS. 5-10 are illustrated as functional blocks that may be implemented using computer readable program code executing in processor, for example, in an integrated PWM-capable microcontroller, such that the microcontroller or other processor provides electronic circuitry that performs the indicated functions. It will be appreciated that analog and/or digital circuitry that provides similar functionality may be used in other embodiments of the invention. In various embodiments of the invention, circuitry such as that supported by FIGS. 5-8 and structural equivalents thereof may be may be used in paralleled UPSs with phase-locked sinusoidal reference signals to provide synchronization of the PWM cycles of the UPSs, and can additionally provide synchronization of data sampling for other functions, e.g., ancillary control functions other than PWM control functions. In this manner, the effects of harmonics on PWM and such other control functions can be reduced.

Figure 5:
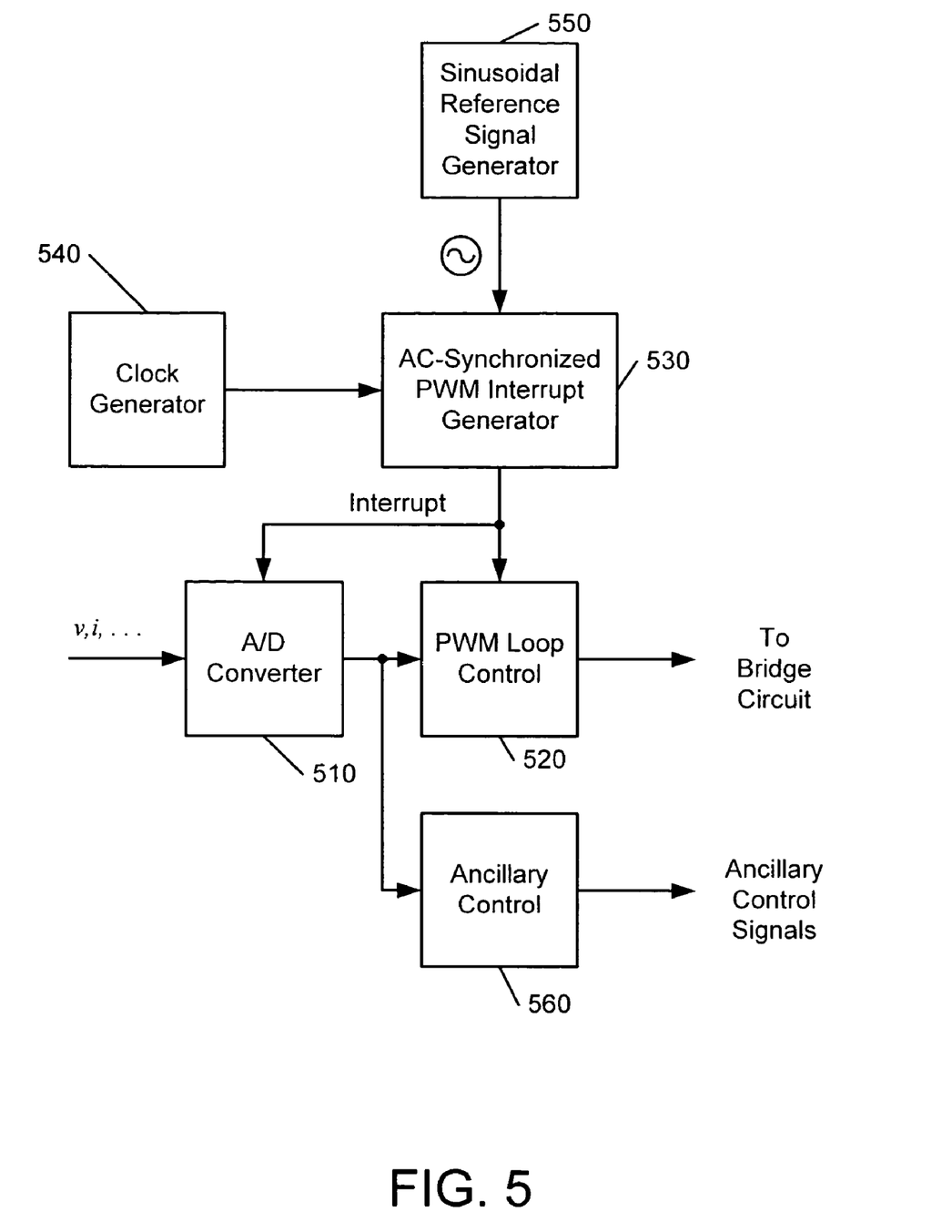
FIG. 5 is a schematic diagram illustrating synchronization of PWM and other control circuitry according to further embodiments of the invention.

The structure includes a PWM loop control block 520 that provides PWM control outputs (e.g., IGBT gate drive signals) to a bridge circuit. The PWM loop control block 520 receives sampled control inputs v; i from an A/D converter block 510 at instants defined by an interrupt signal generated by an AC-synchronized PWM interrupt generator block 530. The AC-synchronized PWM interrupt generator block 530 generates the interrupt signal, which is also provided to the PWM loop control block 520 for timing of its PWM computation and control output cycles (PWM cycles), responsive to a clock signal produced by a clock generator block 540, and synchronizes the interrupt signal to a reference sinusoidal signal generated by a reference sinusoidal signal generator block 550. The reference sinusoidal signal may represent, for example, a frequency and phase corresponding to an AC fundamental voltage on the AC load bus. The AC-synchronized interrupt signal may also be used to sample inputs to an ancillary control block 560, such that sampling of inputs to this control block are synchronized to the PWM cycles.

Figure 6:
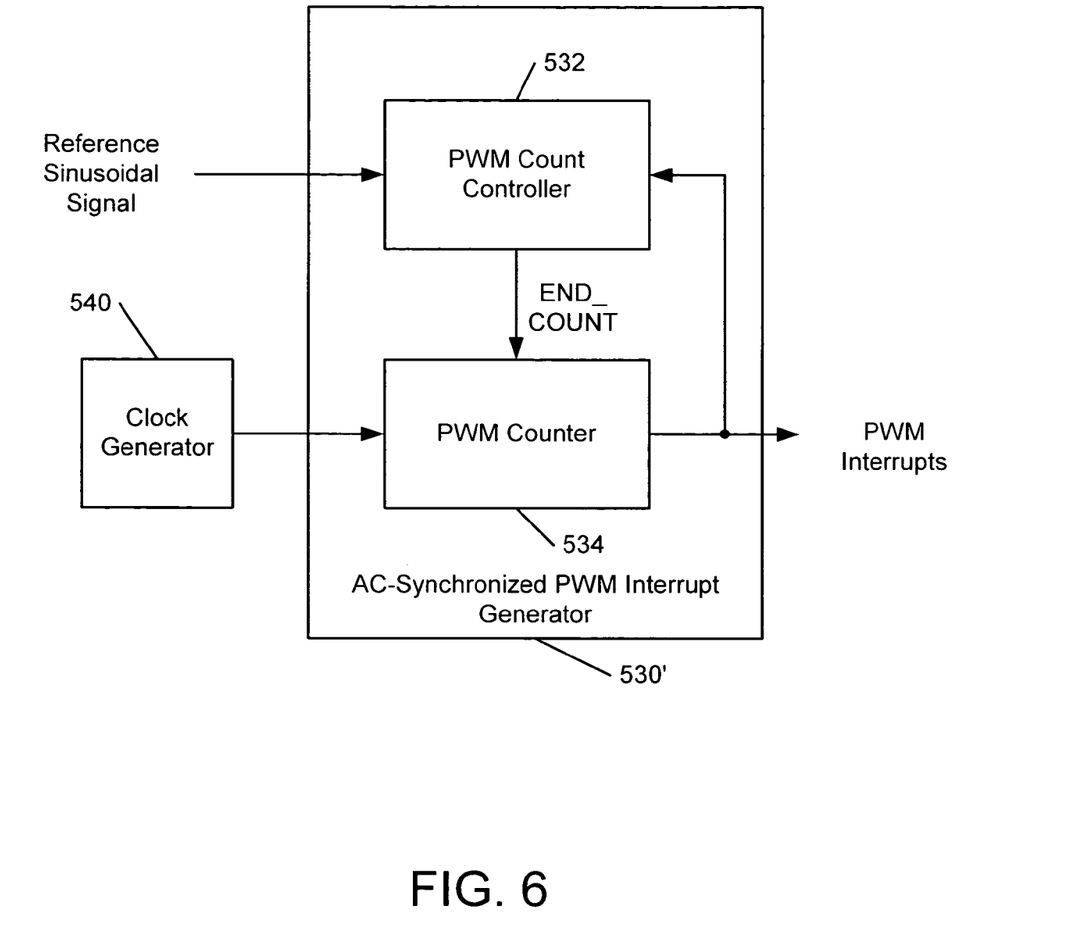
FIG. 6 is a schematic diagram illustrating control of a PWM cycle period according to further embodiments of the invention.

FIG. 6 illustrates an exemplary implementation of an AC-synchronized PWM interrupt generator 530' according to further embodiments of the invention. A PWM counter block 534 counts a PWM count cycle responsive to the system clock signal produced by the clock generator block 540, generating an interrupt signal for each PWM cycle. The PWM count cycle is determined by an end (terminal) count END_COUNT supplied to the PWM counter 534 by a PWM count controller block 532. It will be appreciated that the PWM counter block may be implemented in a number of ways, including using up and/or down counters and/or multiple counting stages. The PWM count controller block 532 is operative to vary the terminal count END_COUNT based on comparison of the interrupts with the reference sinusoidal signal produced by the sinusoidal reference signal generator block 550.

Figure 7:
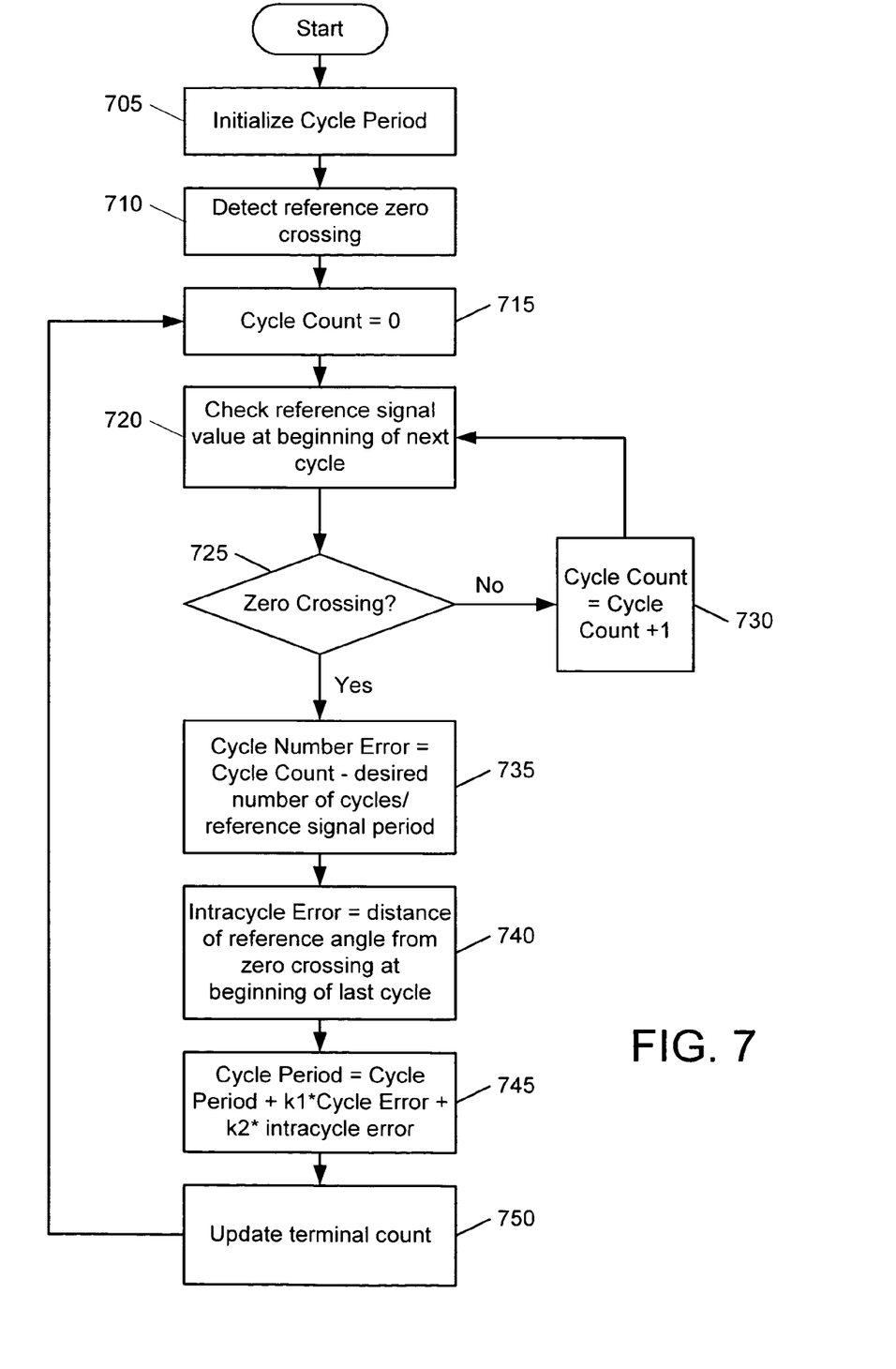
FIG. 7 is a flowchart illustrating exemplary operations for phase locking PWM cycles to a sinusoidal reference signal according to some embodiments of the invention.

Exemplary operations for the PWM counter controller 532 are illustrated with further reference to FIG. 7. A PWM cycle period (e.g., END_COUNT is initialized (block 705). A zero crossing of the sinusoidal reference signal is then detected (block 710) and, in response, a count of PWM cycles (interrupts) is initialized to zero (block 715). Once per PWM cycle, the value of the sinusoidal reference signal is checked (block 720). If no zero crossing is detected (block 725, the PWM cycle count is incremented (block 730), and the PWM counter controller block 532 waits for the next PWM cycle to check the sinusoidal reference signal again (blocks 720, 725).

Upon detection of a zero crossing (block 725), the PWM counter controller block 532 determines an integer cycle number error, representing a difference between a number of complete (integer) cycles actually falling between zero crossings and a predetermined number of complete cycles that should occur between zero crossings (block 735). The PWM counter controller block 532 also determines an intracycle error, which represents a portion of a PWM cycle separating the start (or other indicia) of the PWM cycle with respect to the detected zero crossing (Block 740).

For example, if the sinusoidal reference signal is checked only once per PWM cycle, it may be the case that a zero crossing will not be detected until the immediately following the zero crossing, as it is unlikely for the zero crossing to exactly coincide with an interrupt. Alternatively, the control algorithm could "anticipate" an upcoming zero crossing by detecting, responsive to an interrupt, that a value of the sinusoidal reference signal indicates that the next check of the reference signal will occur following a zero crossing. In either case, the fraction of a PWM cycle separating the zero crossing and the interrupt can be estimated from the value of the sinusoidal reference signal.

From the determined cycle number error and intracycle error, which provide a measure of the number of total number of PWM cycles occurring between zero crossings, a new PWM cycle period may be computed (block 745) and used to generate a new terminal count END_COUNT for the PWM Counter block 534 (block 750). Depending on gains used in determining the new cycle period, the intracycle error may need to be zeroed if the cycle number error and the intracycle error are both negative or both positive. After updating the terminal count END_COUNT, the processes of blocks 715-750 may then be repeated to continuously update the PWM cycle period such that the PWM cycles are phase locked to the sinusoidal reference signal. It will be appreciated that the PWM period may be further subjected to limits such that the PWM frequency may be kept within predetermined bounds if the sinusoidal reference signal becomes aberrant.

Figure 8:
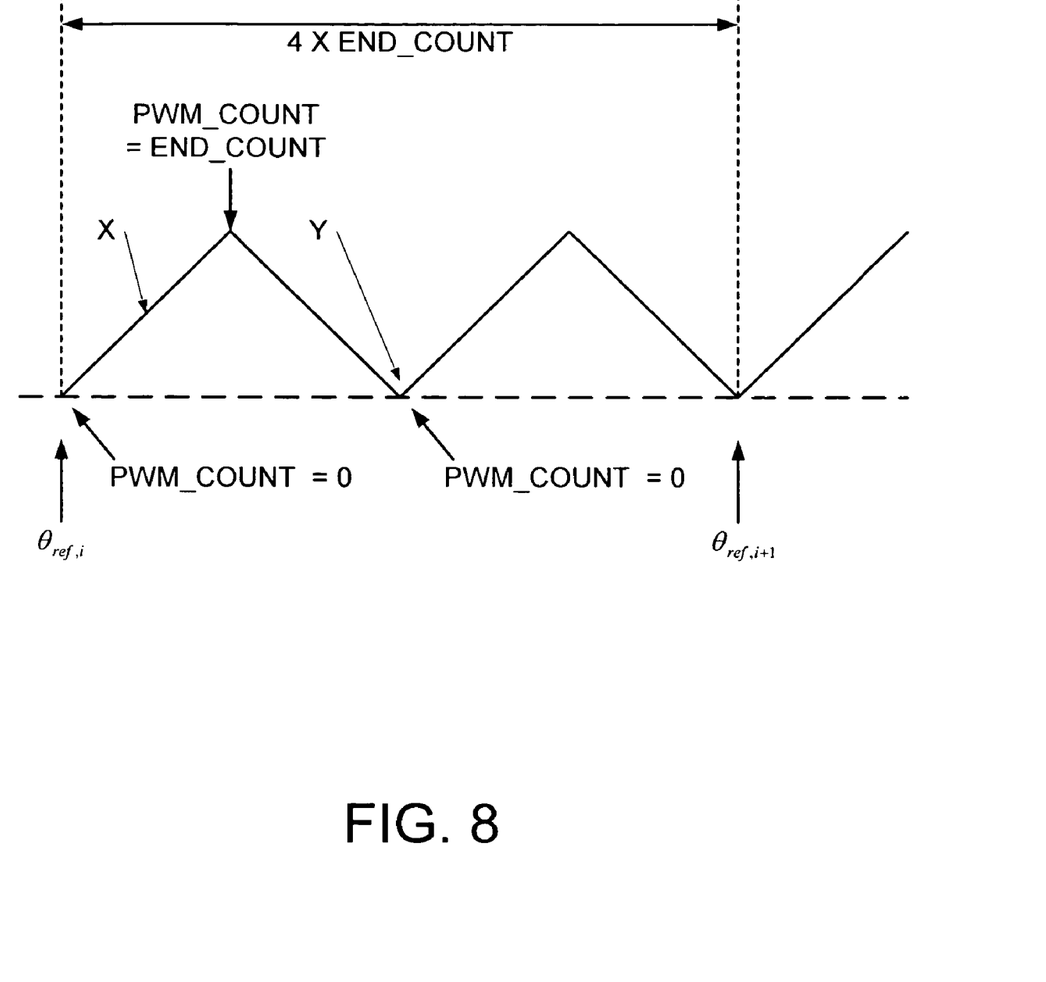
FIG. 8 is a diagram illustrating exemplary timing relationships among PWM cycles and a sinusoidal reference signal according to some embodiments of FIG. 9 is a flowchart illustrating exemplary operations for phase locking PWM cycles to a sinusoidal reference according to further embodiments of the present invention.

FIG. 8 is a diagram illustrating exemplary timing relationships among values produced by a digital sinusoidal reference signal reference signal generator and PWM cycles according to further embodiments of the invention. In the illustrated example, a PWM count PWM_COUNT is counted up from zero (0) to a terminal count END_COUNT and back down to zero in a PWM cycle, and successive sinusoidal reference signal values $\theta_i$, $\theta_{i+1}$ are produced by a digital sinusoidal reference signal generation algorithm once every four (4) of the PWM count cycles (0-END_COUNT). It will be appreciated that the 4 to 1 relationship shown in FIG. 8 is exemplary, and that other relationships may be used with the invention.

An actual zero crossing of the sinusoidal reference signal may be "virtual," e.g., the successive sinusoidal reference signal values $\theta_i$, $\theta_{i+1}$ may be values on opposite sides of a zero crossing. According to some embodiments of the invention, values of the sinusoidal reference signal other than an actual zero crossing may be used to estimate, e.g., interpolate or extrapolate, the point in the 4 PWM count cycle interval at which the "virtual" zero crossing occurs, such that an accurate estimate of phase error of the PWM cycles can be determined and used to phase lock the PWM cycles to the sinusoidal reference signal.

For example, assuming that a zero crossing occurs at the illustrated point X in FIG. 8 between the successive sinusoidal reference signal values $\theta_i$, $\theta_{i+1}$, the location X of the zero crossing, e.g., in terms of a number of PWM counts of the total number of counts 4X END_COUNT, may be obtained by interpolation using the successive sinusoidal reference signal values $\theta_i$, $\theta_{i+1}$. It will be appreciated that this interpolation may be linear or have some other functional basis. A phase error value may then be determined by determining a distance (e.g., in counts) from the point X to a reference point Y of the PWM cycles at which it is desired for the zero crossing to coincide. This phase error may be used to modify the terminal count value END_COUNT to lag or lead the PWM cycles such that the part of the PWM cycle corresponding to point Y is driven towards a zero crossing of the sinusoidal reference signal. It is assumed that each of the paralleled UPSs utilize the same reference point Y such that the same portions of their respective PWM cycles are locked to the zero crossings of the sinusoidal reference signal. It will be appreciated that the choice of the reference count Y is generally arbitrary, and that estimation techniques other than interpolation, such as extrapolation, may be used with the invention.

Figure 9:
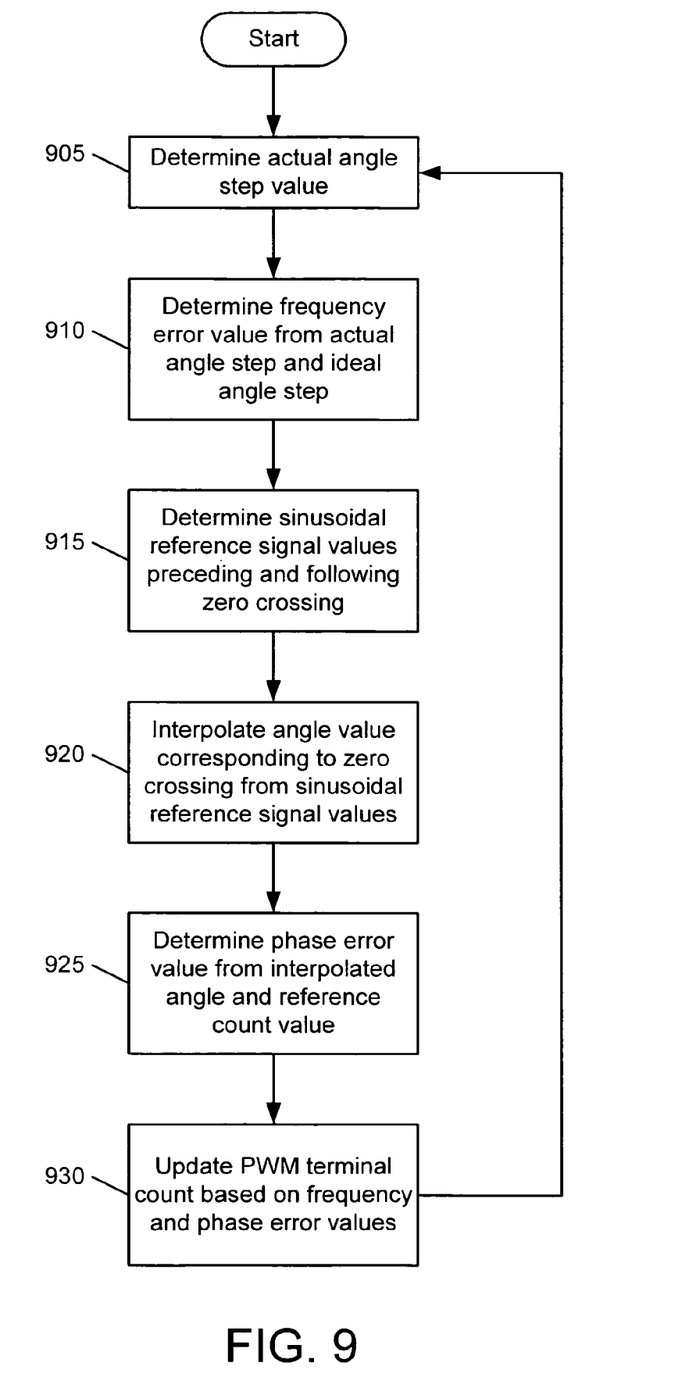

FIG. 9 illustrates exemplary operations for a PWM counter controller, such as the PWM counter controller 532, according to some embodiments of the invention. An actual angle step value, representing the number of degrees (or other angular measure) corresponding to a PWM cycle, is determined (block 905). The actual angle step value is compared with an ideal angle step value, representing a desired angular increment, to determine a frequency error value (block 910). It will be appreciated that, in some UPSs, the actual angle step may be generated as part of a PWM control algorithm as described, for example, in U.S. patent application Ser. No. 10/834,696 to Tracy et al., entitled "Power Converter Apparatus and Methods Using a Phase Reference Derived from a DC Bus Voltage", filed Apr. 29, 2004. The frequency error $e_f$ may be determined according to the following:

$$e_f = \Delta\theta_{ideal} - \Delta\theta_{actual}, \quad (1)$$

where $\Delta\theta_{ideal}$ and $\Delta\theta_{actual}$ are the ideal and actual angle step values, respectively.

As described in the aforementioned U.S. patent application Ser. No. 10/834,696, the angle step value may be accumulated (integrated) to provide an angle value that serves as a reference for a PWM controller. Sinusoidal reference signal values immediately preceding and following a zero crossing are determined (block 915), and value for this accumulated angle corresponding to the zero crossing of the sinusoidal reference signal is interpolated using the sinusoidal reference signal values and corresponding angle values (block 920). A phase error is determined by determining a number of counts from the zero-crossing count value to a reference count value (block 925). For the exemplary timing relationships shown in FIG. 8, the phase error $e_\theta$ may be given by the following:

$$e_\theta = \text{PWM\_COUNT}_{ref} - \left(\frac{\theta_{actual,zc}}{\Delta\theta_{actual}} \times 4 \times \text{END\_COUNT}\right), \quad (2)$$

where PWM_COUNT$_{ref}$ is the desired zero crossing point in the 4 PWM count cycle (e.g., point Y in FIG. 8, which corresponds to 2× the current terminal count END_COUNT), and $\theta_{actual,zc}$ is the interpolated value of the accumulated (integrated) angle corresponding to the zero crossing of the sinusoidal reference signal. The PWM cycle length, i.e., the terminal count END_COUNT, is updated based on the frequency error and the phase error (block 930).

A variety of different techniques may be used to provide phase-locked sinusoidal reference signals in parallel UPSs. For example, a master sinusoidal reference signal could be provided to each UPS. Alternatively, sinusoidal reference signals could be independently generated in each UPS as described, for example, in U.S. Pat. No. 5,745,356 to Tassitino et al., the disclosure of which is incorporated by reference in its entirety. The Tassitino et al. patent describes a technique whereby a sinusoidal reference signal for operation of a PWM inverter of a UPS can be generated by determining a derivative of real power being transferred by the inverter. In this manner, paralleled UPSs can autonomously achieve load sharing without requiring inter-unit signaling.

Figure 10:
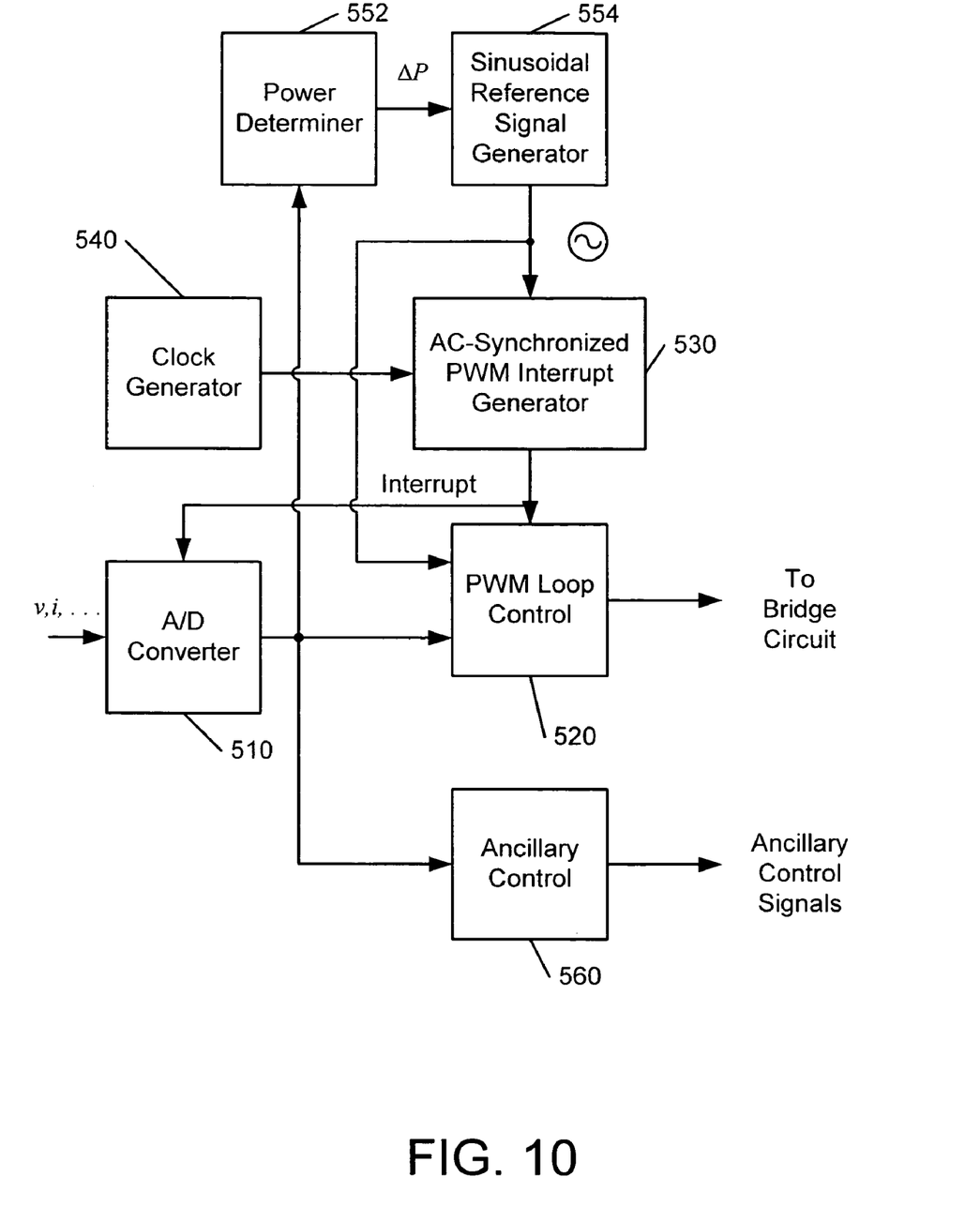
FIG. 10 is a schematic diagram illustrating synchronization of PWM and other control circuitry according to further embodiments of the invention.

As shown in FIG. 10, a digitally-implemented control structure utilizing such a technique may include an A/D converter 510, a PWM loop control block 520, an AC-synchronized PWM interrupt generator block 530, a clock generator block 540 and ancillary control block as described above with reference to FIG. 5. A sinusoidal reference signal generator block 554 generates a sinusoidal reference signal for the AC-synchronized PWM interrupt generator block 530. The sinusoidal reference signal is also used by the PWM loop control block 520 to provide a reference for generation of an AC output voltage by the bridge circuit controlled by the PWM loop control block 520. The sinusoidal reference signal is generated responsive to a power signal ΔP representative of a change in real power generated by a power determiner block 552 responsive to voltage and current data sampled by the A/D converter block 510.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A method of operating a plurality of paralleled uninterruptible power supplies (UPSs), the UPSs including respective pulse-width modulation (PWM) power converter circuits coupled in common to an AC load bus, the method comprising:
    providing a phase reference corresponding to an AC voltage phase for the AC load bus, wherein providing a phase reference corresponding to an AC voltage phase for the AC load bus comprises providing respective sinusoidal reference signals at respective ones of the UPSs; and
    synchronizing PWM cycles of the PWM power converter circuits of each of the power converter circuits to the phase reference, wherein synchronizing PWM cycles of the PWM power converter circuits of each of the power converter circuits to the phase reference comprises synchronizing the respective PWM cycles of the UPSs to the respective sinusoidal reference signals and wherein synchronizing the respective PWM cycles of the UPSs to the respective sinusoidal reference signals comprises:
        determining a number of PWM cycles occurring between phase indicia of a sinusoidal reference signal; and
        adjusting a PWM cycle duration responsive to the determined number of PWM cycles.

2. A method according to claim 1, wherein synchronizing PWM cycles of the PWM power converter circuits comprises synchronizing sampling of control inputs of the PWM power converter circuits.

3. A method according to claim 2, wherein synchronizing sampling of control inputs to the PWM power converter circuits comprises phase locking the PWM cycles such that sampling of control inputs to the PWM power converter circuits occurs at substantially the same time for each of the PWM power converter circuits.

4. A method according to claim 1, further comprising determining respective power transfers at the common AC load bus for the respective UPSs, and wherein providing respective sinusoidal reference signals at respective ones of the UPSs comprises generating the respective sinusoidal reference signals responsive to the respective determined power transfers.

5. A method according to claim 1, wherein synchronizing the respective PWM cycles of the UPSs to the respective sinusoidal reference signals comprises:
    determining a timing error of PWM cycles with respect to a sinusoidal reference signal; and
    adjusting a PWM cycle duration responsive to the determined timing error.

6. A method according to claim 1, wherein the phase indicia comprise zero crossings of the sinusoidal reference signal.

7. A method according to claim 1:
    wherein determining a number of PWM cycles occurring between phase indicia of a sinusoidal reference signal comprises:
        determining a number of complete PWM cycles occurring between a first phase indicator of the sinusoidal reference signal and a second phase indicator of the sinusoidal reference signal; and
        determining a fraction of a PWM cycle occurring between a phase indicator of a PWM cycle and the second phase indicator of the sinusoidal reference signal; and
    wherein adjusting a PWM cycle duration responsive to the determined number of PWM cycles comprises adjusting the period of the PWM cycle based on the determined number of complete PWM cycles and the determined fraction of a PWM cycle.

8. A method according to claim 1, wherein providing respective sinusoidal reference signals at respective ones of the UPSs comprises providing a master sinusoidal reference signal to each of the UPSs.

9. A method according to claim 1, wherein at least one of the UPSs further includes an additional control circuit that samples an operating parameter of the at least one UPS and wherein the method further comprises synchronizing sampling of the operating parameter to the synchronized PWM cycles of the at least one UPS.

10. A method according to claim 9, wherein synchronizing sampling of the operating parameter to the synchronized PWM cycles of the at least one UPS comprises sampling input data for the PWM power converter circuit and the additional control circuit of the at least one UPS responsive to a common interrupt.

11. A method according to claim 1, wherein the PWM power converter circuits comprise respective inverters having respective outputs coupled to the common AC load bus.

12. A method of operating a plurality of paralleled uninterruptible power supplies (UPSs), the UPSs including respective pulse-width modulation (PWM) power converter circuits coupled in common to an AC load bus, the method comprising:
    providing a phase reference corresponding to an AC voltage phase for the AC load bus, wherein providing a phase reference corresponding to an AC voltage phase for the AC load bus comprises providing respective sinusoidal reference signals at respective ones of the UPSs; and
    synchronizing PWM cycles of the PWM power converter circuits of each of the power converter circuits to the phase reference, wherein synchronizing PWM cycles of the PWM power converter circuits of each of the power converter circuits to the phase reference comprises synchronizing the respective PWM cycles of the UPSs to the respective sinusoidal reference signals, and wherein synchronizing the respective PWM cycles of the UPSs to the respective sinusoidal reference signals comprises:
        estimating a frequency error by comparing an actual angle step of a PWM cycle to a desired angle step;
        estimating a zero crossing location of the sinusoidal reference signal with respect to a PWM cycle from discrete values of the sinusoidal reference signal;
        estimating a phase error by comparing the estimated zero crossing location to a reference point of a PWM cycle; and
        adjusting a PWM cycle duration responsive to the frequency error and the phase error.

13. A system, comprising:
a plurality of paralleled UPSs, the UPSs including respective PWM power converter circuits coupled in common to an AC load bus and operating according to synchronized PWM cycles, wherein the UPSs comprise means for synchronizing the PWM cycles of each of the power converter circuits to a phase reference corresponding to an AC voltage for the AC load bus, wherein the UPSs include respective means for generating respective sinusoidal reference signals and respective means for synchronizing their respective PWM cycles with their respective sinusoidal reference signals, and wherein at least one of the UPSs comprises means for determining a number of PWM cycles occurring between phase indicia of the sinusoidal reference signal of the at least one UPS and for adjusting a PWM cycle duration of the at least one UPS responsive to the determined number of PWM cycles.

14. A system according to claim 13, wherein the UPSs have synchronized sampling of control inputs for their PWM converters.

15. A system according to claim 14, wherein the UPSs comprises means for phase locking their PWM cycles such that sampling of control inputs to their PWM power converter circuits occurs at substantially the same time.

16. A system according to claim 13, wherein the UPSs comprise respective means for generating the respective sinusoidal reference signals responsive to respective power transfers thereof.

17. A system according to claim 13, wherein at least one of the UPSs comprises means for determining a timing error of PWM cycles of the at least one UPS with respect to the sinusoidal reference signal of the at least one UPS and for adjusting a PWM cycle duration of the at least one UPS responsive to the determined timing error.

18. A system according to claim 13, wherein the phase indicia comprise zero crossings of the sinusoidal reference signal.

19. A system according to claim 13, wherein the at least one of the UPSs comprises means for determining a number of complete PWM cycles occurring between a first phase indicator of the sinusoidal reference signal and a second phase indicator of the sinusoidal reference signal, for determining a fraction of a PWM cycle occurring between a phase indicator of a PWM cycle and the second phase indicator of the sinusoidal reference signal, and for adjusting a PWM cycle duration of the at least one UPS based on the determined number of complete PWM cycles and the determined fraction of a PWM cycle.

20. A system according to claim 13, wherein at least one of the UPSs comprises means for estimating a frequency error by comparing an actual angle step per PWM cycle to a desired angle step, for estimating a zero crossing location of the sinusoidal reference signal with respect to a PWM cycle from discrete values of the sinusoidal reference signal, for estimating a phase error by comparing the estimated zero crossing location to a reference point of a PWM cycle, and for adjusting a PWM cycle duration responsive to the frequency error and the phase error.

21. A system according to claim 13, wherein at least one of the UPSs further includes an additional control circuit that samples an operating parameter of the at least one UPS and wherein the at least one UPS is operative to synchronize sampling of the operating parameter to the synchronized PWM cycles of the at least one UPS.

22. A system according to claim 21, wherein the at least one UPS is operative to sample input data for the PWM power converter circuit and the additional control circuit of the at least one UPS responsive to a common interrupt.

23. A system according to claim 21, wherein the operating parameter comprises an electrical quantity susceptible to a signal generated on the AC load bus by at least one of the PWM power converter circuits.

24. A system according to claim 13, wherein the PWM power converter circuits comprise respective inverters having outputs coupled to the common AC load bus.

25. An uninterruptible power supply (UPS), comprising:
a first PWM power converter circuit configured to be coupled to an AC load bus; and
a PWM cycle synchronizer circuit operative to synchronize PWM cycles of the PWM power converter circuit to PWM cycles of a second PWM power converter circuit coupled to the AC load bus, wherein the PWM cycle synchronizer circuit is operative to synchronize the PWM cycles of the first PWM power converter circuit to a phase reference corresponding to an AC voltage for the AC load bus, wherein the PWM cycle synchronizer circuit further comprises a sinusoidal reference signal generator circuit operative to generate a sinusoidal reference signal, wherein the PWM cycle synchronizer circuit is operative to synchronize the PWM cycles of the first PWM power converter circuit to the sinusoidal reference signal, and wherein the PWM cycle synchronizer circuit is operative to determine a number of PWM cycles occurring between phase indicia of the sinusoidal reference signal and to adjust a PWM cycle duration responsive to the determined number of PWM cycles.

26. A UPS according to claim 25, wherein the PWM cycle synchronizer circuit is operative to synchronize sampling of control inputs of the first PWM power converter circuit to sampling of control inputs for the second PWM power converter circuit.

27. A UPS according to claim 26, wherein the PWM cycle synchronizer circuit is operative to phase lock the PWM cycles of the first PWM power converter circuit to PWM cycles of the second PWM power converter circuit such that sampling of control inputs to the first and second PWM power converter circuits occurs at substantially the same time.

28. A UPS according to claim 25, further comprising a power determiner circuit operative to determine a power transfer for the first PWM power converter circuit at the AC load bus and wherein the sinusoidal reference signal generator circuit is operative to generate the sinusoidal reference signal responsive to the determined power transfer.

29. A UPS according to claim 25, wherein the PWM cycle synchronizer circuit is operative to determine a timing error of PWM cycles with respect to the sinusoidal reference signal and to adjust a PWM cycle duration responsive to the determined timing error.

30. A UPS according to claim 25, wherein the phase indicia comprise zero crossings of the sinusoidal reference signal.

31. A UPS according to claim 25, wherein the PWM cycle synchronizer circuit is operative to determine a number of complete PWM cycles occurring between a first phase indicator of the sinusoidal reference signal and a second phase indicator of the sinusoidal reference signal, to determine a fraction of a PWM cycle occurring between a phase indicator of a PWM cycle and the second phase indicator of the sinusoidal reference signal, and to adjust a PWM cycle duration based on the determined number of complete PWM cycles and the determined fraction of a PWM cycle.

32. A UPS according to claim 25, wherein the PWM cycle synchronizer circuit is operative to estimate a frequency error by comparing an actual angle step per PWM cycle to a desired angle step, to estimate a zero crossing location of the sinusoidal reference signal with respect to a PWM cycle from discrete values of the sinusoidal reference signal, to estimate a phase error by comparing the estimated zero crossing location to a reference point of a PWM cycle, and to adjust a PWM cycle duration responsive to the frequency error and the phase error.

33. A UPS according to claim 25, further comprising an additional control circuit that samples an operating parameter of the UPS and wherein the PWM synchronizer circuit is operative to synchronize sampling of the operating parameter to the synchronized PWM cycles.

34. A UPS according to claim 33, where the PWM synchronizer circuit generates a common interrupt for sampling input data for the PWM power converter circuit and the additional control circuit.

35. A UPS according to claim 25, wherein the first PWM power converter circuit comprises an inverter having an output coupled to the AC load bus.

\* \* \* \* \*